Figure 1:
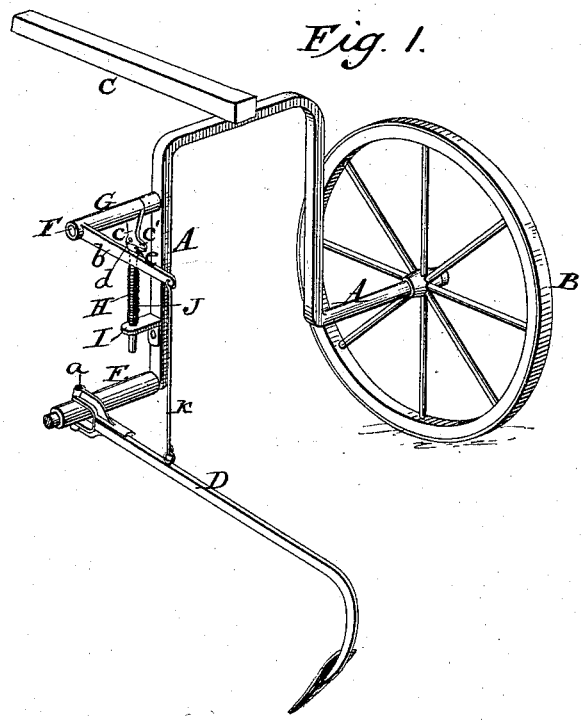

(No Model.) 2 Sheets—Sheet 1.

E. P. LYNCH.
CULTIVATOR.

No. 263,187. Patented Aug. 22, 1882.

Attest.
Sidney P. Hollingsworth
Newton Wyckoff

Inventor:
E. P. Lynch,
By his attorney
Philip T. Dodge.

N. PETERS, Photo-Lithographer, Washington, D. C.

(No Model.) 2 Sheets—Sheet 2.
E. P. LYNCH.
CULTIVATOR.
No. 263,187. Patented Aug. 22, 1882.
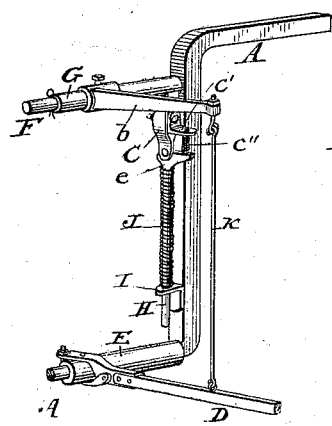
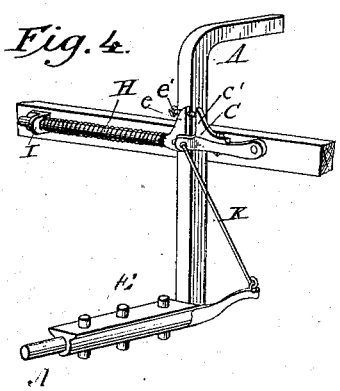
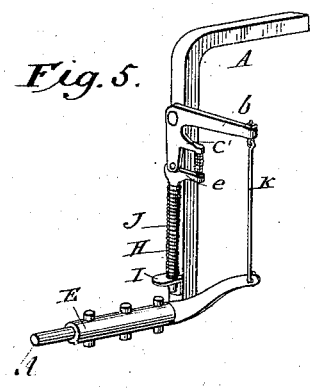
Attest.
Sidney P. Hollingsworth
Newton Wyckoff
Inventor.
E. P. Lynch
By his Attorney
Philip T. Dodge

UNITED STATES PATENT OFFICE.

EDWARD P. LYNCH, OF DAVENPORT, IOWA.

CULTIVATOR.

SPECIFICATION forming part of Letters Patent No. 263,187, dated August 22, 1882.

Application filed June 13, 1882. (No model.)

*To all whom it may concern:*

Be it known that I, EDWARD P. LYNCH, of Davenport, in the county of Scott and State of Iowa, have invented certain Improvements in Cultivators, of which the following is a specification.

This invention relates to that class of cultivators in which the shovels are attached to beams jointed at their forward ends to a wheeled draft-frame in such manner that they may be moved horizontally to follow the rows of corn and vertically to throw them into and out of action, and particularly to an improved spring attachment designed to raise or assist the operator in raising the beams above an operative position without interfering with their lateral motion when in action. The arrangement is designed so that when the beams are in an operative position they will be subjected to little or no lifting strain.

The invention consists essentially in mounting on the frame of the machine, in any suitable position, a pair of arms or levers acting on the principle of the familiar knee-lever or toggle-joint, and combining therewith an actuating spring or springs and a pendulous rod or chain connected to the plow-beam or its adjuncts, as set forth.

As will be hereinafter explained, the devices may be changed in detail and arrangement without changing their mode of action or departing from the invention.

The attachment is applicable to any and all machines in which the beams have a vertical and lateral motion, but is designed more particularly for use in connection with what are commonly known in the art as "walking straddle-row" cultivators, in which an arched axle is provided at its ends with supporting-wheels and with couplings to which the plow-beams are attached; and it is to this class that the machine represented in the drawings belongs.

Figure 2:
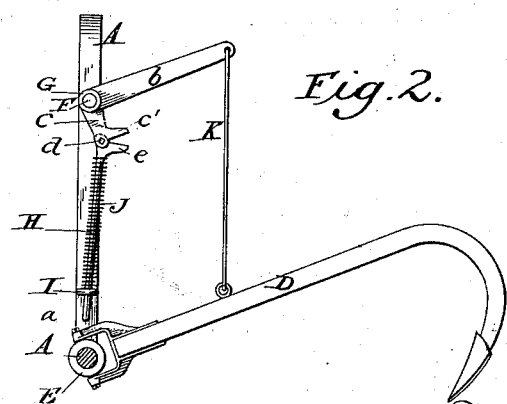

Referring to the accompanying drawings, Figure 1 is a perspective view of the machine with my devices applied to one side only, the two sides being in practice the duplicates of each other, as usual. Fig. 2 represents a side elevation of the same with the beam in its elevated position. Figs. 3, 4, and 5 are perspective views, illustrating the attachment in modified forms similar in their mode of action to the device illustrated in the preceding figures.

Referring to the drawings, Figs. 1 and 2, A represents the axle, having its central portion arched upward, as shown, this axle being commonly known in the art as an "arch." B represents the supporting-wheels applied to the horizontal ends of the axle; C, the draft-pole or tongue, and D one of the two plow-beams. This beam has its forward end provided with a jaw or coupling head mounted upon vertical trunnions $a$, formed upon a horizontal pipe box or sleeve, E, mounted loosely around the end of the axle. The trunnions permit the beam to swing laterally, while the rotation of the sleeve upon the axle permits it to swing vertically in order to throw the shovels into and out of the ground. The above parts are of ordinary construction and form no part of my invention.

To the side of the arched frame, by preference immediately above the axle, I connect a rigid horizontal arm or journal, F, and on this arm I mount a rotating sleeve, G, provided with a backwardly-extending arm, $b$, and with a depending arm, $c$. The arm $c$ is provided at its lower end with a backward extension, $c'$, and is connected near its forward edge by a pivot, $d$, to the upper end of the rod H, the lower end of which latter passes through a guide plate or arm, I, secured to the side of the axle. It will be observed that the upper end of the rod H is free to swing with the arm $c$, while its lower end slides vertically through the guide I. The upper end of the rod H is provided with a backwardly-extending arm, $e$, to co-operate with the arm $c'$, as hereinafter explained. Around the rod H, between the plate I and arm $e$, I mount a strong spiral spring, J, which tends constantly to urge the rod H upward. To the rear end of the horizontal arm $b$, I connect a depending rod or chain, K, the lower end of which is attached in any suitable manner to the plow-beam at a suitable distance in the rear of its coupling-head.

When the parts are in an operative position, as shown in Fig. 1, the supporting-arm F, the axle, and the pivot $d$ stand in line or substantially in line with each other, so that the spring attachment has little or no effect upon the beam. When, however, the beam is elevated the connection K, releasing the arm $b$, permits the sleeve G to turn forward, swinging its depending arm $c$ backward. By this action the pivot $d$ is carried to the rear, the rod H and arm $c$ being thrown out of line with each other, so that the rod H is urged upward by the spring, and, acting upon the arm $c$, causes the latter to turn the sleeve G, thereby swinging the arm $b$ of the sleeve upward and causing said arm, through the rod or chain K, to exert a strong lifting action upon the beam, the beam rising above an operative position and throwing the shovel out of the ground, as represented in Fig. 2. The spring may be of sufficient strength and the parts properly arranged to effect the lifting of the beam and its suspension without any assistance on the part of the operator. It will be seen that, inasmuch as the beam is suspended by a long connection from the arm immediately above it, it is free to swing laterally when in action without impediment. It will also be observed that as the beam descends, bringing the parts to the original position, as represented in Fig. 1, the lifting effect of the spring upon the beam is diminished, the action ceasing or being reduced to such an extent as to be of no practical importance by the time that the shovels enter the ground. This is an important feature of the invention, as the shovel is prevented from riding out of the ground, as it would were it subjected to the lifting action when in use. When the beam is in an operative position the fingers $c'$ and $e$ encounter each other, as shown in Fig. 1, serving thereby to limit the descent of the beam and keep the shovels from running too deeply in the ground.

If desired, the joint through which the pivot $d$ passes may be slotted vertically, in which case the beam may be forced to a limited extent from its operative position, the spring action tending to bring the parts back to the positions shown in Fig. 1 when the beam is released.

Referring to Fig. 3, the arrangement of parts therein represented is essentially the same as that above described, but with the differences hereinafter noted. First, the arm $b$ is made adjustable laterally upon the sleeve G to correspond with the lateral adjustments of the beam D, in order that the beam may be suspended at all times from a point directly above it. The arm $b$ is adapted to encircle the sleeve, and is secured thereon by means of a set-screw; but it may be otherwise attached to admit of the lateral adjustment. This mode of attachment will also admit of the end of the arm being adjusted vertically in relation to the sleeve to vary the tension of the spring and the depth to which the shovel enters the ground. This last-named adjustment will also be secured by connecting the rod K to the arm $b$ by means of an eyebolt, as shown in Fig. 3, the bolt being passed through the arm $b$, and provided with a nut on its upper end to admit of the bolt being adjusted vertically.

The second feature in which the device in question differs from those before described consists in the application of the second spiral spring, $c''$, between the backward extensions formed on the arm C and rod H, respectively. As the beam is lowered to an operative position the spring $c''$ is compressed, and by its resistance, exerted through the intermediate parts, it tends to limit the descent of the beam and to give the beam and shovels when in action a spring-support, causing them to ride easily and smoothly.

Passing next to Fig. 4, the devices are very similar to those described in the preceding figures, the essential difference being that the arm C and rod H are arranged horizontally upon the side of the draft pole or frame instead of vertically. In this instance the beam-suspending rod K is attached to the inner distal end of the arm C, and extended thence to an arm formed on the rotary coupling sleeve or head by which the beam is drawn. The rod K arranged in this manner may, however, be connected at its lower end to the beam instead of to the arm upon the coupling. The descent of the rod K, and thereby the descent of the beam, is limited by means of the arms $c'$ and $e$, similar to those described in the preceding figures. The descent of the beam may be adjusted by means of a set-screw, $e'$, applied as shown in the drawings, or by any other equivalent stop device which will limit the descent of the arm $c$.

Fig. 5 illustrates an arrangement nearly identical with that represented in Figs. 1 and 2, the essential difference being, first, that a second spring is applied, as in Fig. 3, between the arms $e$ and $c'$ to limit the descent of the beam and give the same an elastic support when in action; and, second, that the suspending-rod is attached, as in Fig. 4, to an arm on the pipe box or coupling, instead of being attached directly to the beam.

From the foregoing description it will be seen that the peculiar location or arrangement of the lifting devices upon the frame is a matter of secondary importance, and that they may be modified in various respects without, in fact, changing the general mode of action.

Having thus described my invention, what I claim is—

1. In combination with the vertically swinging beam, the suspending rod or chain, the sleeve provided with the horizontal arm to which the suspending device is attached, and also with the depending arm, the movable rod jointed to said depending arm, and the spring arranged to urge the rod upward, as described and shown.

2. In combination with the beam and the arched axle, the arm or journal F, secured to the axle, the sleeve provided with the two arms and mounted upon the journal, the suspending device extending from one of said arms to the beam, and the spring-actuated device operating upon the other of said arms, substantially as described and shown.

3. In combination with the beam, the elevated rotary sleeve or bearing provided with two arms, the connecting device extending from one of said arms to the beam, provided with the spiral spring J, and the rod H, mounted at one end in the guide I, and having its opposite end pivoted to the arm of the sleeve and provided with the finger e, co-operating with a corresponding finger on the sleeve, substantially as and for the purpose described.

EDWARD P. LYNCH.

Witnesses:
A. L. SKIELS,
NATHL. FRENCH.